United States Patent [19]
Nakajima

[11] Patent Number: 5,770,896
[45] Date of Patent: Jun. 23, 1998

[54] INPUT SWITCHING CONTROL DEVICE AND COMMUNICATION CIRCUIT

[75] Inventor: Yasuhisa Nakajima, Kanagawa, Japan

[73] Assignee: Sony Corporation, Tokyo, Japan

[21] Appl. No.: 538,778

[22] Filed: Oct. 3, 1995

[30] Foreign Application Priority Data

Oct. 5, 1994 [JP] Japan .................................. 6-241073

[51] Int. Cl.$^6$ .................................................. H02H 3/12
[52] U.S. Cl. ......................... 307/125; 307/116; 307/130; 324/628; 340/870.01; 364/550
[58] Field of Search ..................................... 307/125, 116, 307/130; 340/870.01; 324/628; 364/550

[56] References Cited

U.S. PATENT DOCUMENTS

| | | | |
|---|---|---|---|
| 4,431,867 | 2/1984 | Heatherington ............................ | 179/2 |
| 5,027,057 | 6/1991 | Mageland et al. ....................... | 324/115 |
| 5,264,843 | 11/1993 | Silvian ................................. | 340/870.18 |
| 5,539,321 | 7/1996 | Sciacero et al. ........................ | 324/628 |

*Primary Examiner*—William M. Shoop, Jr.
*Assistant Examiner*—Albert W. Paladini
*Attorney, Agent, or Firm*—Frommer Lawrence & Haug LLP; William S. Frommer

[57] ABSTRACT

A communication circuit capable of accurately detecting the signal level of the transmitted signal without impairing interchangeability with respect to an existing communication circuit. The communication circuit includes a first arithmetic unit 110 and a second arithmetic unit 120. The first arithmetic unit 110 executes arithmetic operations of $$K=R1/(R1+R2)$$

$$V4=V3-K \times V1$$

where V1 is a voltage of a transmission signal on a receiving side 100, R1 is a transmission impedance on the receiving side 100, V2 is a voltage of the transmission signal on a transmitting side 200, R2 is a transmission impedance on the transmitting side 200 and V3 is a voltage of the transmission signal transmitted to the receiving side 100 via a control line CL interconnecting the transmitting side 200 and the receiving side 100. The second arithmetic unit 120 executes an arithmetic operation of $$V5=2 \times V4$$

using the result of the operation by the first arithmetic unit 110 and detects the transmission level of the receiving side 200 with the voltage V5 resulting from the arithmetic operations being set so as to be the voltage V2 of the transmitted signal on the transmitting side 200.

36 Claims, 7 Drawing Sheets

INPUT SWITCHING CONTROL DEVICE AND COMMUNICATION CIRCUIT

BACKGROUND OF THE INVENTION

This invention relates to an input switching control circuit for automatically effectuating input switching between a television receiver, a video tape recorder and an audio-related equipment by taking advantage of full duplex bi-directional communication or unidirectional communication employed in e.g., telephone circuitry. The present invention also relates to a communication circuit for effectuating the above-mentioned full duplex communication or the unidirectional communication.

A television receiver, abbreviated herein to TV receiver, has plural external terminals loaded thereon. A video tape recorder, abbreviated to VTR, may be connected to these external terminals for allowing a picture reproduced by the VTR to be viewed on the screen of the TV receiver.

That is, if the VTR is connected to the TV receiver for viewing the picture reproduced by the VTR on the screen of the TV receiver, the user first effectuates initial setting as to to which of the external input terminals of the TV receiver the VTR is connected.

The user then sets the TV receiver, by a remote controller dedicated to the TV receiver, or by a mode setting switch provided on the TV receiver, to an input mode, associated with the external input terminals to which the VTR remains connected. This switches the input mode of the TV receiver to an input from the VTR.

The user presses a button "playback" provided on a remote controller or a main body of the VTR, by way of selecting the operation. This starts the operation of the VTR so that picture signals are sent therefrom to the TV receiver.

Thus the TV receiver displays a picture, corresponding to the picture signals supplied from pre-switched external input terminals, on a screen.

For switching the external input terminals as described above, the TV receiver and the VTR are each generally provided with a semi-duplex bi-directional circuit, and control signals are transmitted by the semi-duplex bi-directional circuit in accordance with the semi-duplex communication system.

Although data can be transmitted from one of the parties to the other party with the semi-duplex communication system, only unidirectional communication is possible simultaneously. Thus, if the above-mentioned control signal specifying the operating state for the VTR is transmitted at all times, it becomes impossible to transmit any other control signals.

On the other hand, the operation of initialization as to to which of the control terminals the connected equipment is connected is complex, while the user is compelled to execute the operation of initialization each time the state of connection is to be modified.

In addition, since three jumper wires are required for interconnecting the equipments, the initializing operation becomes extremely complex.

If, when a full duplex bi-directional circuit capable of simultaneously transmitting data from both parties to the opposite parties is used in place of the above-mentioned semiduplex bi-directional circuit, the output impedance ratio between the transmitting and receiving circuits becomes higher, transmitted signals cannot be detected correctly.

As a conventional full duplex bi-directional circuit, there is known (FIG. 1) a circuit in which a reference voltage Vref of a voltage comparator IC1 is added or subtracted depending upon the transmitted signal for detecting a transmitted signal OUT1. In general, the signal drive impedance Dr1 on the transmitting or receiving side with such full duplex bi-directional circuit is monistically determined by a resistance RI.

By the logic for transmission for both parties, the voltage of a control line CL (common line) is "O" if both the transmitted signal OUT1 and the signal to be transmitted OUT 2 are both low (L), while the common line voltage becomes one-half the height level H and equal to the high level H if one of the signals is H or both of the signals are H, respectively, as shown in FIG. 2.

Simultaneously, the reference voltage Vref of the voltage controller IC1 becomes equal to ¼ and ¾ of the source voltage level, depending upon the level of the transmitted signal OUT1, as shown in FIG. 3. Thus the transmission level of the opposite party can be detected by comparing the reference voltage Vref to the voltage on the control line CL by the voltage comparator IC1.

However, since the H level of the signal being transmitted OUT1 is distinct from the power source of the reference voltage Vref of the voltage comparator IC1, any voltage difference, if produced, leads to a decreased margin in the voltage difference employed for comparison by the voltage comparator IC1.

For example, if the maximum voltage of the H level of the signal to be transmitted OUT2 is 4 V, the maximum voltage of the H level of the signal being transmitted OUT1 is 3 V and the power source of the reference voltage Vref is 5 V, the voltage of the control line CL assumes four voltage values of 0 V, 1.5 V, 2 V and 3.5 V, while the reference voltage Vref assumes voltage values of 1.2 v and 3.75 V, such that the margin becomes small for the control line voltages of 1.5 V and 3.5 V. The result is that the level of the signal being transmitted OUT1 cannot be detected correctly thus leading to a mistaken operation.

On the other hand, if the circuit is changed or an operating step is added for controlling the operation between different equipments, such as the TV receiver and the VTR, the transmission system for control signals becomes different from the conventional system, so that an existing equipment cannot be connected to another equipment in which the circuit has been changed or operational steps have been added as described above.

OBJECTS AND SUMMARY OF THE INVENTION

It is therefore an object of the present invention to provide an input switching device which can be connected to existing equipments and which permits facilitated interconnection between different equipments.

It is another object of the present invention to provide a communication device which permits correct detection of the level of the signal being transmitted without impairing interchangeability with existing communication circuits.

In one aspect, the present invention provides an input switching control device having communication means for effecting full duplex bi-directional communication or uni-directional communication, detection means for detecting the operating information supplied from at least one external device via the communication means, and control means for effecting switching control between an internal input and an external input responsive to results of detection of the detection means. The control mans manages control so that, when the operating information is detected by the detection means, an input is switched to an input from one of the external device associated with the detected operating information for executing an operation corresponding to the detected operating information. Since automatic switching may be made between the internal input and the external input responsive to the operating information from an equipment connected to another equipment fitted with the input switching device, connection with an existing equipment becomes possible, while connection between the equipments is facilitated.

In another aspect, the present invention provides a communication circuit for detecting the transmission level on the transmission side for executing full duplex bidirectional communication or unidirectional communication which includes first arithmetic means for executing arithmetic operations $$K=R1/(R1+R2)$$

$$V4=V3-K\times V1$$

where V1 is a voltage of a transmission signal on the receiving side, R1 is a transmission impedance on the receiving side, V2 is a voltage of the transmission signal on the transmitting side, R2 is a transmission impedance on the transmitting side and V3 is a voltage of the transmission signal transmitted to the receiving side via a control line interconnecting the transmitting and receiving sides, and second arithmetic means for executing an arithmetic operation $$V5=2\times V4$$

based upon the result of the operation by the first arithmetic means. The transmission level on the transmitting side is detected with the voltage V5 obtained by the first and second arithmetic means being set so as to be the voltage V2 of the transmission signal on the transmitting side. Thus the signal level of the transmitted signal may be detected accurately without impairing interchangeability with resect to the conventional full duplex bi-directional circuit.

Preferably, the communication circuit according to the present invention also includes comparator means for comparing the voltage V3 of the transmission signal transmitted to the receiving side to a comparison reference voltage, and varying means for varying the transmission impedance R1 on the receiving side based upon the result of comparison by the comparator means. This enables the signal level of the transmitted signal to be detected more accurately.

DESCRIPTION OF THE PREFERRED EMBODIMENT

Figures 1, 2, 3:
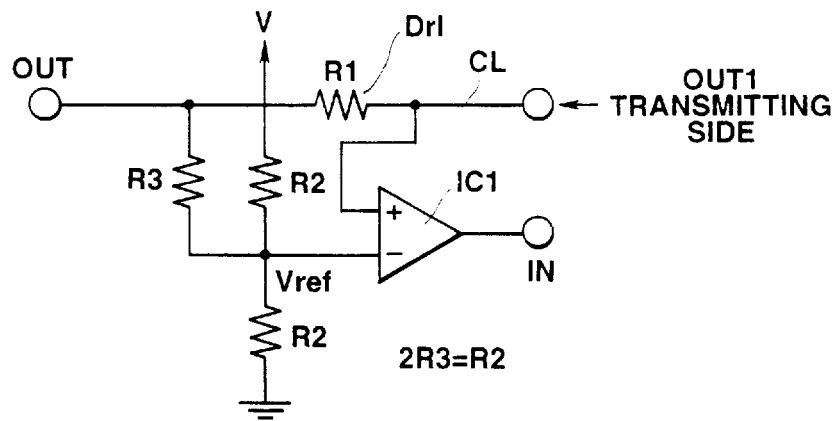
FIG. 1 is a schematic circuit diagram showing an arrangement of a conventional communication circuit for full duplex bi-directional communication.
FIG. 2 illustrates changes in voltage on a control line of the communication circuit.
FIG. 3 illustrates changes in a reference voltage of a voltage comparator of the communication circuit.

Referring to the drawings, a preferred embodiment of the present invention will be explained in detail.

First, the communication circuit of the present invention is explained.

Figure 4:
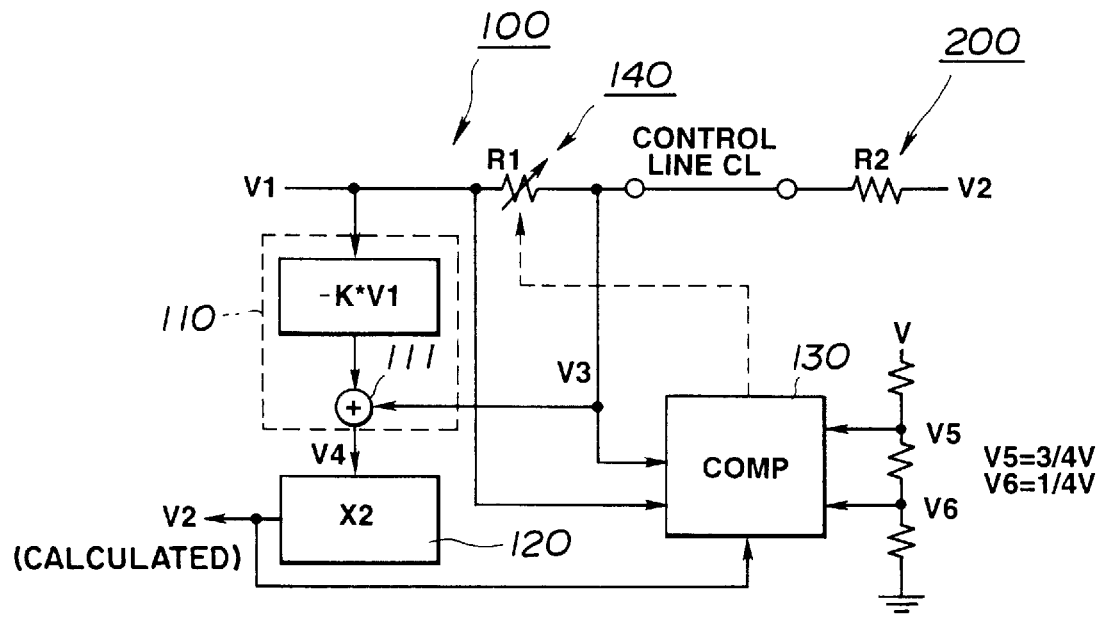
FIG. 4 is a circuit diagram showing an arrangement of a communication circuit according to the present invention.

Referring to FIG. 4, the communication circuit, performing e.g., full duplex bi-directional communication, includes first arithmetic means 110 and second arithmetic means 120 which doubles the results of operation V4 by the first arithmetic means to give a voltage as a voltage V2 of a transmission signal of a transmission side 200, for detecting the transmission level of the transmitting side 200. The communication circuit also includes comparator means 130 for comparing a voltage V3 of the transmission signal transmitted to a receiving side 100 to comparison reference voltages V5, V6, and varying means 140 for varying a transmission impedance R1 of the receiving side responsive to the results of comparison by the comparator means 130.

The first arithmetic means includes an addition unit 111 which executes an arithmetic operation of $$K=R1/(R1+R2)$$

$$V4=V3-K\times V1$$

where V1 is a voltage of a transmission signal of a receiving side 100, R1 is a transmission impedance of the receiving side 100, V2 is the voltage of the transmission signal of the transmission side, R2 is a transmission impedance of the transmitting side 200 and V3 is a voltage of the transmission signal transmitted to the receiving side 100 via a control line CL interconnecting the transmitting side 200 and the receiving side 100.

That is, the voltage V3 of the transmission signal transmitted to the receiving side over the control line CL is $$V3=(R2\times V1+R1+V2)/(R1+R2)$$

For finding the voltage V2 of the transmission signal of the transmitting side 200, the voltage V1 of the transmission signal of the receiving side 100, multiplied by (−K×R1), is added by the addition unit 111 to the voltage V3. If $$K=R1/(R1+R2)$$

and $$R1=R2$$

then "k" may be approximated substantially to ½.

Thus a voltage V4 obtained by the first arithmetic unit 110 is given by $$V4=V3-K\times V1/2+V2/2-V1/2=V2/2$$

The second arithmetic means 120 then executes an arithmetic operation $$V5=2\times V4$$

using the result V4 of the first arithmetic unit 110. That is, by doubling the voltage V4 (=V2/2), obtained by the first arithmetic means 110, the voltage V2 of the transmission signal of the transmission side 200 may be found correctly.

Figure 5:
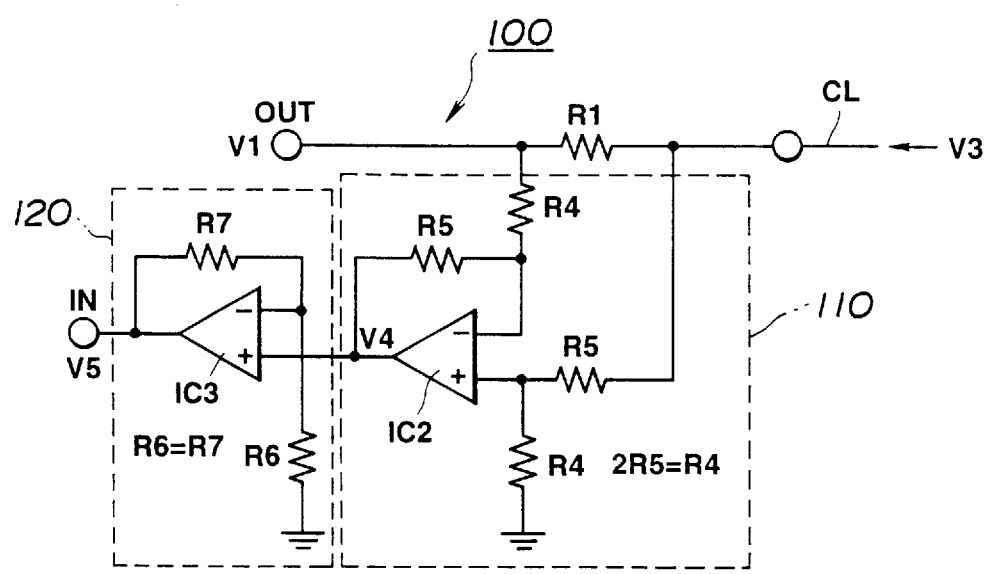
FIG. 5 is a circuit diagram showing first and second arithmetic means of the communication circuit.

Referring to FIG. 5, showing an actual circuit of the first arithmetic means 110 and the second arithmetic means 120, the first arithmetic means 110 and the second arithmetic means 120 are comprised of operational amplifiers IC2 and IC3, respectively, as shown in FIG. 5.

In the first arithmetic means 110, the voltage V1 of the signal to be transmitted is divided by an impedance ratio of impedances R4 and R5 into fractional voltages which are entered to a subtractive terminal IC2(−) of the operational amplifier IC2. The voltage V3 of the transmission signal, transmitted to the receiving side 100 over the control line CL, enters an additive terminal IC(+) of the operational amplifier IC2.

The operational amplifier IC2 subtracts a voltage equal to one-half the input voltage to the subtractive terminal IC2(−) from the voltage V3 from the control line CL to transmit the voltage V4 (=V3−1/2V1) to the additive terminal IC3(+) of the operational amplifier IC3.

The operational amplifier IC3 doubles the voltage V4 from the operational amplifier IC2 and outputs the resulting voltage as a voltage V5.

It is assumed that the voltage V3 of the signal transmitted over the control line CL becomes 0V, 1.5V, 2V and 3.5V, and the voltage to be transmitted V1 becomes 1V and 4V.

If the voltage V1 is 0V, the voltage V3 is 0V and 1.5V. As a result of the arithmetic operation at the operational amplifier IC2, the voltage V4 becomes equal to the voltage V3, while the voltage V5 outputted from the operational amplifier IC3 is no other than the voltage of the signal transmitted from the transmitting side.

On the other hand, if the voltage V1 is 4V, the voltage V3 is 2V and 3.5V. As a result of the arithmetic operation at the operational amplifier IC2, the voltage V4 becomes equal to 0V and 1.5V, while the voltage V5 outputted from the operational amplifier IC3 is again no other than the voltage of the signal transmitted from the transmitting side.

Since the voltage of the signal transmitted over the control line CL is divided into fractional voltages by the transmission impedance R1, the transmission signal level from the transmission side can be correctly detected by subtracting the voltage equal to one-half the voltage V1 of the signal to be transmitted from the voltage V3.

If the ratio between the transmission impedance R1 of the receiving side 100 and the transmission impedance R2 of the transmission side 200, shown in FIG. 4, is larger, the voltage V2 of the transmission signal of the transmitting side 200 is changed in value.

Thus, in such case, the comparator means 130 generates two reference voltages for comparison V5 and V6 from the voltage V3 of the transmission signal transmitted to the receiving side 100 over the control line CL and the H-level value of the voltage V1 of the transmission signal of the receiving side 100. If the voltage V1 of the transmission signal of the receiving side 100 is at the H level and the voltage V2 of the transmission signal of the transmitting side 200 is at the L level, the voltage V3 is compared to the reference voltages for comparison V5, V6 and the result of comparison is supplied to varying means 140.

If the result of comparison is V5>V3 and V6>V3, the transmission impedance R1 of the receiving means 100 is larger than the transmission impedance R2 of the transmission side R2 (R1>R2), so that the varying means 140 manages control so that the transmission impedance R1 of the receiving side R1 will become smaller. Conversely, of the result of comparison is V5<V3 and V6<V3, the transmission impedance R1 of the receiving means 100 is smaller than the transmission impedance R2 of the transmission side 200 (R1<R2), so that the varying means manages control so that the transmission impedance R1 of the receiving side R1 will become larger.

If V5>V3 and V6<V3, the varying means judges that the transmission impedance R1 of the receiving side 100 is substantially equal to the transmission impedance R2 of the transmitting side 200,(R1=R2) and does not perform the variable control of the transmission impedance R1 of the receiving side 100.

Thus, should non-matching be incurred in output impedance in the communication circuit, impedance matching can be achieved by employing a communication circuit shown in FIG. 4 on one side for correctly detecting the transmission voltage V2 of the transmitting side 200. That is, the transmitted signal level can be detected correctly without deteriorating the interchangeability with respect to the conventional communication circuit.

The operation of the above-described communication circuit is now explained.

The transmission side 200 transmits the transmission signal of the voltage V2 via the transmission impedance R2 and the control line CL to the receiving side 100.

At this time, the transmission signal of the voltage V2 transmitted by the transmitting side 200 is transmitted to the receiving side 100 as a voltage transmission signal of $$V3=(R2 \times V1 + R1 \times V2)/(R1+R1+R2)$$

The transmission signal of the voltage V3 is supplied to the first arithmetic means 110 and the comparator means 130, while the signal of the voltage to be transmitted V1 is also supplied to the first arithmetic means 110 and the comparator means 130.

The first arithmetic means 110 executes arithmetic operations of $$K=R1/(R1+R2)$$
$$V4=V3-K \times V1$$

to transmit the resulting voltage V4 to the second arithmetic means 120.

The second arithmetic means 120 sets the voltage V5, obtained on doubling the voltage V4 from the first arithmetic means 110, so as to be the voltage V2 of the transmission signal of the transmitting side 200, in order to detect the transmission level of the transmitting side 200.

At this time, the second arithmetic means 100 transmits the voltage V5 obtained by the above arithmetic operation, that is the detected voltage V2 of the transmission signal of the transmission side 200, to the comparator means 130.

The comparator means 130 generates the two reference voltages for comparison V5, V6 from the voltage V3 of the transmission signal from the transmitting side 200 and the H-level of the voltage V1 of the transmission signal. If the voltage V1 of the transmission signal is at the H-level and the voltage V5 obtained by the second arithmetic means 120, that is the voltage V2 of the transmission signal, is at the L level, the comparator compares the voltage V3 to the two generated reference voltages for comparison V5, V6, and sends the result of comparison to the varying means 140.

The varying means 140 varies the transmission impedance R1, in response to the result of comparison from the comparator means 130, for impedance, matching between the transmission impedance R2 from the transmission side 200 and the transmission impedance R1.

Thus the transmission signal of the voltage V3, transmitted to the receiving side 100 over the control line CL, is supplied to the first arithmetic means 110 via the transmission impedance R1 varied by the varying means 140.

The first arithmetic means 110 and the second arithmetic means 120 execute the above-mentioned arithmetic operations for detecting the transmission level on the transmitting side 200.

The above-mentioned communication circuit according to the present invention is able to detect the level of the signal transmitted from the communication side correctly and hence can also be applied to transmission of an analog voltage.

Although the communication circuit of the illustrated embodiment effectuates full duplex bi-directional communication, it may also be a communication circuit effectuating unidirectional communication.

The input switching control device according to a first embodiment is hereinafter explained.

Figure 6:
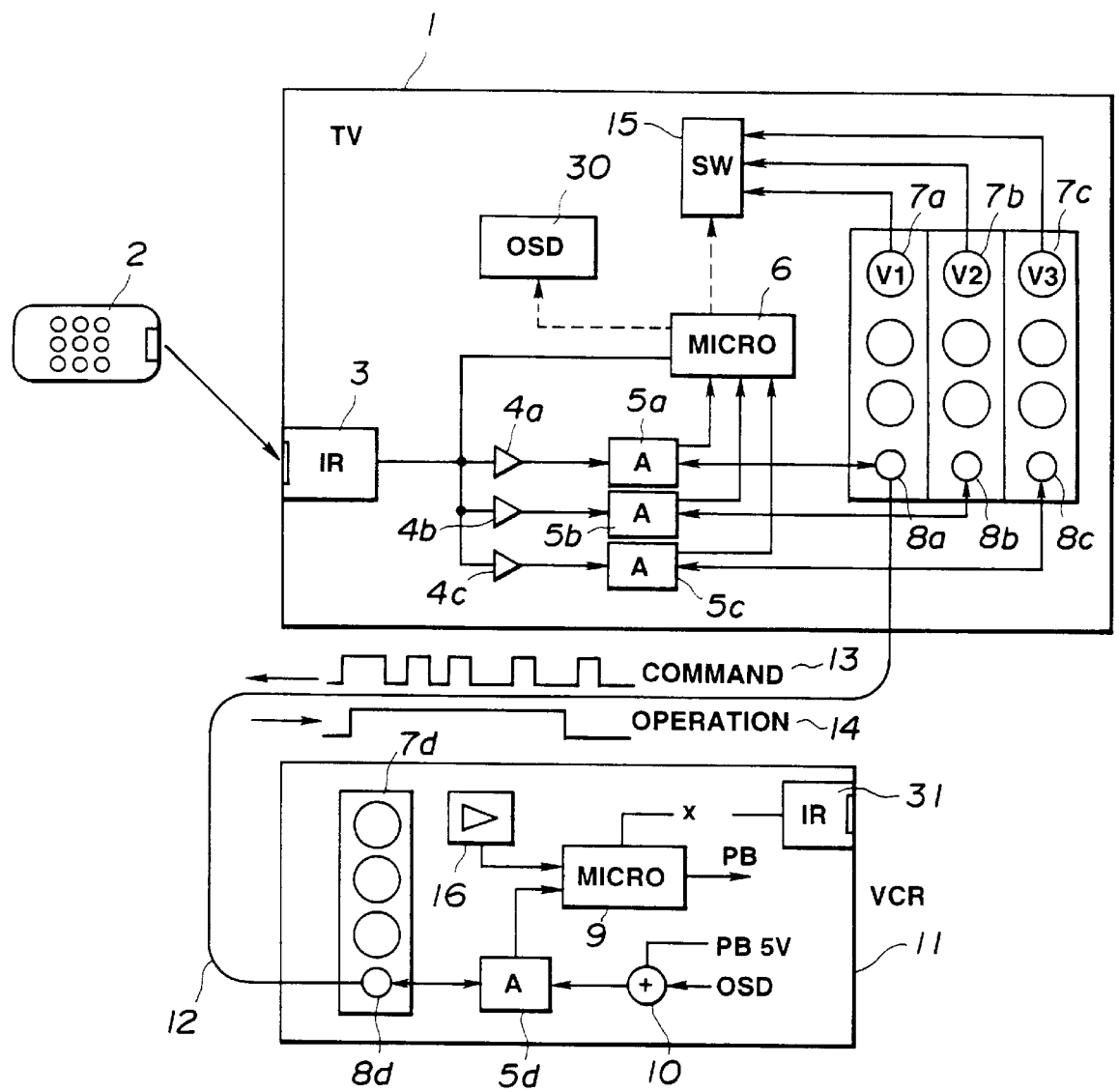
FIG. 6 illustrates the state of connection between a TV receiver and a VTR under application of an input switching device according to the present invention.

The input switching device is applied to TV receiver 1 and a video tape recorder (VTR) 11, as shown in FIG. 6. The TV receiver TV1 and the VTR VTR 11 are provided with communication circuits 5a to 5c and a communication circuit 5d, shown in FIG. 4, respectively.

The communication circuits 5a to 5c and a communication circuit 5d each execute e.g., full duplex bi-directional communication.

Specifically, the TV receiver 1 includes external input terminals 7a to 7c, control input/output terminals 8a to 8c for effecting input/output of control signals to and from the equipments connected thereto. The TV receiver TV1 also includes communication circuits 5a to 5c and buffers 4a to 4c. The TV receiver TV1 also includes an input changeover switch 15 and a micro-computer 6 operating as controlling means for detecting the operating information supplied from the external input terminals 7a to 7c via the communication circuits 5a to 5c for controlling the switching of the input changeover switch 15 responsive to the result of detection. The TV receiver also includes a remote controlled light receiving unit for receiving the operating information selected by an IR remote control device (remote controller) and an on-screen display device (OSD) 30 for displaying e.g., a message at the time of setting the VTR for selection the user by taking advantage of the screen of the TV receiver 11.

The input terminals 7a to 7c are associated with the control input/output terminals 8a to 8c. The buffer 4a is connected to the communication circuits 5a which in turn is connected to the control input/output terminal 8a. Similarly, the buffer 4b is connected to the communication circuits 5b which in turn is connected to the control input/output terminal 8b, while the buffer 4c is connected to the communication circuit 5c which in turn is connected to the control input/output terminal 8c. The external input terminals 7a to 7c are all connected to the input switching circuit 15.

The operating information of the equipments connected in circuit with the TV receiver TV1 is fed to the micro-computer 6 from the communication circuits 5a to 5c via the control input/output terminals 8a to 8c, respectively. If the operation is done from the remote controller 2, the operating information received by the remote controller 3 is fed via the micro-computer 6 and the buffers 4a to 4c to the control input terminals 8a to 8c.

The micro-computer 6 effects switching control of the input changeover switch 15 for selecting the external input terminal associated with the control input/output terminal to which is entered the supplied operating information. The micro-computer 6 also controls the OSD display unit 30 for displaying the message or the like for selection by the user, by taking advantage of the screen of the TV receiver 1, when the user sets the VTR-11 or executes e.g. timer recording.

Details of the control operation by the micro-computer 6 will be explained subsequently.

Turning more specifically to the construction of the VTR 11, the VTR 11 includes an external output terminal 7d for outputting reproduced picture and speech signals to outside, a communication circuit 5d, a micro-computer 9, a replay button 16, an addition unit 10 and a remote-controlled light receiving unit 31 for receiving the operating information selected by a remote controller dedicated to the VTR, not shown.

An output of the external output terminal 7d is associated with a control input/output terminal 8d. For example, the control input/output terminal 8a of the TV receiver TV1 is connected via a control line 12 to the control input/output terminal 8d. The external input terminal 7a of the TV receiver 1 is connected to the external output terminal 7d.

The micro-computer 9 manages control based upon the actuation of the replay button 16 or upon the operating information received by the remote-controlled light receiving unit 31 on actuation of the remote controller. The micro-computer also manages control based upon the operating information from an equipment which is connected in circuit with the VTR and which is supplied via the control input/output terminal 8d and the communication circuit 5d.

For commands, that is the information exchanged between the TV receiver TV1 and the VTR 11 connected in circuit with each other, for example, the operating information for controlling the VTR 11 from the TV receiver 1, the code employed in the remote controller 2 is directly employed. The signals transmitted from the VTR 11 to the TV receiver TV1 are DC voltage signals. The code employed by the remote controller 2 is previously matched to the VTR 11 in the TV receiver 1. If, for example, plural commands are transmitted from the VTR 11 to the TV receiver 1, the micro-computer 9 of the VTR11 re-transmits the code, which is the same as the code employed by the remote controller 2, to the TV receiver 1 for detecting the operating states.

The input switching operation between the TV receiver TV1 and the VTR 11 is hereinafter explained.

If the user intends to reproduce the VTR 11, he or she presses the relay button 16, by way of selecting an operation.

The micro-computer 9 detects the pressing of the replay button 16 and controls the operation of the entire system so that the VTR 11 is in the playback state. When the VTR 11 is in the playback state, the playback DC voltage specifying the playback state is entered from the micro-computer 6 to the communication circuit 5d, which then transmits the playback DC voltage from the micro-computer 6 via the control input/output terminal 8d and the control line 12 to the TV receiver TV1.

The playback DC voltage transmitted from the VTR 11 to the TV receiver 1 is supplied via the control input/output terminal 8a of the TV receiver 1 to the communication circuit 5a. The communication circuit detects the playback DC voltage transmitted from the VTR 11 and transmits the detected playback DC voltage to the micro-computer 6.

The micro-computer 6 detects the rise of the playback DC voltage from the communication circuit 5a and switching-controls the input changeover switch 15 for selecting the external input terminal 7a associated with the control input/output terminal 8a via which the playback DC voltage has been entered.

Thus the picture signals and speech signals from the external output terminal 7d of the VTR 11, entering the external input terminal 7a, are selected as input signals, so that a picture derived from the picture signals is displayed on the screen of the TV receiver TV1, while the speech derived from the audio signals is outputted at the speaker.

If the user stops the VTR 11, the user presses a button "stop"0 of the VTR 11, not shown.

In this case, as in the case of playback, the micro-computer 9 deciphers the "stop" command indicating the stop state, and controls the operation of the entire system so that the VTR 11 will be in the stop state. When the VTR 11 is in the stop state, the playback DC voltage ceases to be supplied to the communication circuit 5d.

Since the playback DC voltage ceases to be detected by the micro-computer 6 of the TV receiver 1, the micro-computer 6 switching-controls the input changeover switch 15 from the input from the external input terminal 7a connected to the VTR 11 to the input within the TV receiver TV1.

If the user stops the VTR 11, the TV receiver TV1 is automatically restored to the original input state under control of the micro-computer 1 of the TV receiver 1.

If the user sets the VTR 11 or effects an operation such as timer recording, the user presses a menu button of the TV receiver 11, not shown.

The micro-computer 9 detects the pressing of the menu button and controls the operation of the entire system so that the VTR 111 will be in the OSD display state. When the VTR 11 is in the OSD display state, an OSD display DC voltage, specifying the OSD operation, is entered from an OSD circuit, not shown, to the communication circuit 5d via the additive unit 10. The communication circuit 5d sends the input OSD display DC voltage via the control input/output terminal 8d and the control line 12 to the TV receiver 1.

The OSD displaying DC voltage, transmitted from the VTR 11 to the TV receiver 1, is supplied via the control input/output terminal 8a of the TV receiver TV1 to the communication circuit 5a. The communication circuit 5a detects the OSD displaying DC voltage transmitted from the VTR 11, and sends the detected OSD displaying DC voltage to the micro-computer 6.

The micro-computer 6 detects the rising of the OSD displaying DC voltage from the communication circuit 5a and switching-controls the input changeover switch 15 for selecting the external input terminal 7a associated with the control input/output terminal 15 via which the OSD displaying DC voltage has been entered.

Thus the TV receiver 1 is responsive to the OSD displaying operation to automatically select the external input, under control by the micro-computer 6, for performing the operation corresponding to the operating information entered from outside.

In this case, the OSD displaying DC voltage, specifying the OSD displaying operation, is entered from an OSD circuit, not shown, via the additive unit 10 to the communication circuit 5d. However, the OSD displaying DC voltage may also be entered from the micro-computer 9 to the communication circuit 5d.

In the above-described embodiment, the operation is selected by pressing the replay, stop or menu buttons. However, the operation selection may also be by corresponding actuation of the remote controller 2 of the TV receiver 1.

When the VTR 11 is reproduced by operation of the remote controller 2, the user presses the replay button of the remote controller 2. The replay command from the remote controller 2 is received by the remote-controlled light receiving unit 3 of the TV receiver TV1. The remote-controlled light receiving unit 3 sends the received replay command via the buffers 4a to 4c to the communication circuits 5a to 5c, respectively. The communication circuits 5a, 5b and 5c detect the replay command received by the remote controlled light receiving unit 3 in order to send the detected replay command to the control input/output terminals 8a, 8b and 8c, respectively. Thus the replay command is transmitted from the TV receiver 1 to the VTR 11 over the control line 12.

The replay command transmitted from the TV receiver TV1 to the VTR 11 is supplied via the control input/output terminal 8d to the communication circuit 5d, which then detects the replay command from the TV receiver 1 and transmits the detected replay command to the micro-computer 9. The micro-computer 9 deciphers the replay command from the communication circuit 5d in order to control the operation of the entire system so that the VTR 11 will be in the playback state.

Thus the VTR 11 is in the playback state, by the operation from the remote controller 2. As in the case of the pressing of the replay button 16 provided in the VTR 11, the VTR has its input switched to the external input terminal 7a, to which the VTR 11 is connected, under control by the micro-computer 6 of the TV receiver TV1, so that the playback picture signals and playback speech signals of the VTR 11 may be selected automatically.

If the stop button or the menu button is pressed, the microcomputer 9 deciphers the command transmitted from the TV receiver 1, as in the case when the replay button is pressed, and controls the operation of the VTR 11 for establishing the operating state corresponding to the command, that is the stop state or the OSD displaying state. Thus the TV receiver 1 has its input automatically switched depending on the operating state.

Thus the equipment desired by the user, herein the VTR 11, transmits the operating information, such as playback or stop, and the TV receiver 1 detects the transmitted operating information and automatically switches its input to the input of the described equipment, by providing the full duplex bidirectional communication circuits for both the TV receiver TV1 and VTR11. This eliminates the necessity of setting the complex connection between the equipments such as is required in the conventional practice, thus facilitating the connection between the equipments.

Although the above-described communication circuit effectuates full duplex bi-directional communication, similar effects may be realized if the communication circuit is designed for unidirectional communication.

On the other hand, since the code employed in the remote controller 2 is directly employed as the command controlling the VTR 11 from the TV receiver TV1, and the signal transmitted from the VTR 11 to the TV receiver TV1 is the DC voltage, the control process for the existing circuit may be facilitated. An other command code or a communication protocol may also be adopted for expanding the control range. For example, if a novel command code is adopted, the name of the equipment currently connected in circuit with the TV receiver TV1 may be displayed on the screen of the TV receiver TV1 by appending an identification code of the equipment connected to the TV receiver 1, as in the case of the control command.

If plural commands as the DC voltages are transmitted from the VTR 11 to the TV receiver TV1, the code which is the same as the code currently employed in the remote controller 2 of the TV receiver 1 may be re-transmitted for detecting the operating state after transmitting the DC voltages by the micro-computer 9 of the VTR 11 for relieving the load of the software built in the micro-computer 6 of the TV receiver 1.

On the other hand, control connectors loaded on existing equipments may be employed for the control input/output terminals 8a, 8b and 8c and the control input/output terminal 8d for transmitting the control signals, such as the above-mentioned operating information for achieving interchangeability with the existing equipments.

There may also be supplemented a function of automatically turning on the power source of the VTR 11 if, when the rise of the DC voltage entering any one of the control input/output terminals 8a, 8b and 8c of the TV receiver 1 is detected, the power source of the VTR 11 is off.

Although only one VTR 11 is connected in the above-described embodiment to the TV receiver TV1, it is also possible to connect a plurality of existing VTRs to the TV receiver TV1.

Specifically, the micro-computer 6 of the TV receiver TV1 detects the rise and fall of the signals from the communication circuits 5a, 5b and 5c in order to effect switching control of the input changeover switch 15. In consideration of signal overlap caused by plural VTRs, that is VTR 11, VTR12 and VTR13, being connected in circuit with the TV receiver 1, the judgment shown in FIG. 7 is given in order to effect switching control.

Figure 7:
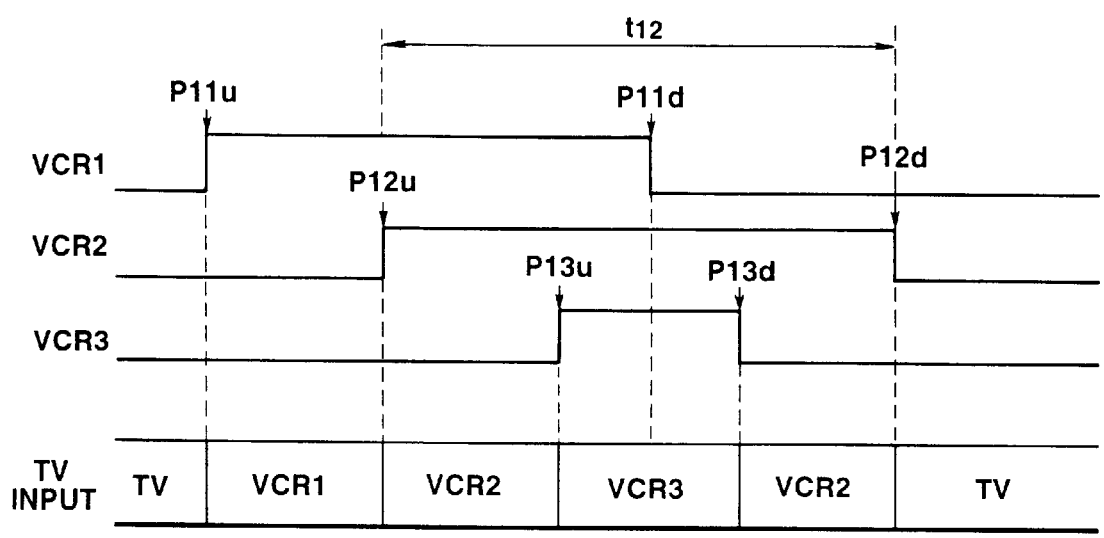
FIG. 7 illustrates an input switching operation for a TV receiver.

That is, if a signal rise P11u of a signal of the VTR 11 is detected, as shown in FIG. 7, the micro-computer 6 manages control for switching the input of the TV receiver 1 so that the input of the TV receiver TV1 is an input from the VTR 11. Next, if a signal rise P12u of the signal of the VTR 12 is detected, the micro-computer 6 manages control for switching the input of the TV receiver TV1 so that the input of the TV receiver TV1 is an input from the VTR 12.

If, during the time tl2 when a signal decay P12d of the signal of the VTR12 is not detected, a signal decay P11d of the signal of the VTR 11 is detected, the external input of the TV receiver 1 remains to be the input from the VTR12.

If then a signal rise P13u of the VTR13 is detected, the micro-computer 6 manages control for switching the input of the TV receiver TV1 so that the input of the TV receiver 1 is an input from the VTR13. If a signal decay P13d of the VTR13 is detected, the micro-computer 6 switches the input of the TV receiver TV1 so that the input of the TV receiver 11 is an input from the VTR12 the signal decay P12d of which has not been detected.

If the decay P12d of the signal of the VTR12 is detected, the micro-computer 6 manages control for switching the input to the internal input of the TV receiver 1.

The micro-computer 6 then switches the input in this manner so that priority will be placed on an equipment which is in operation at later time.

Figure 8:
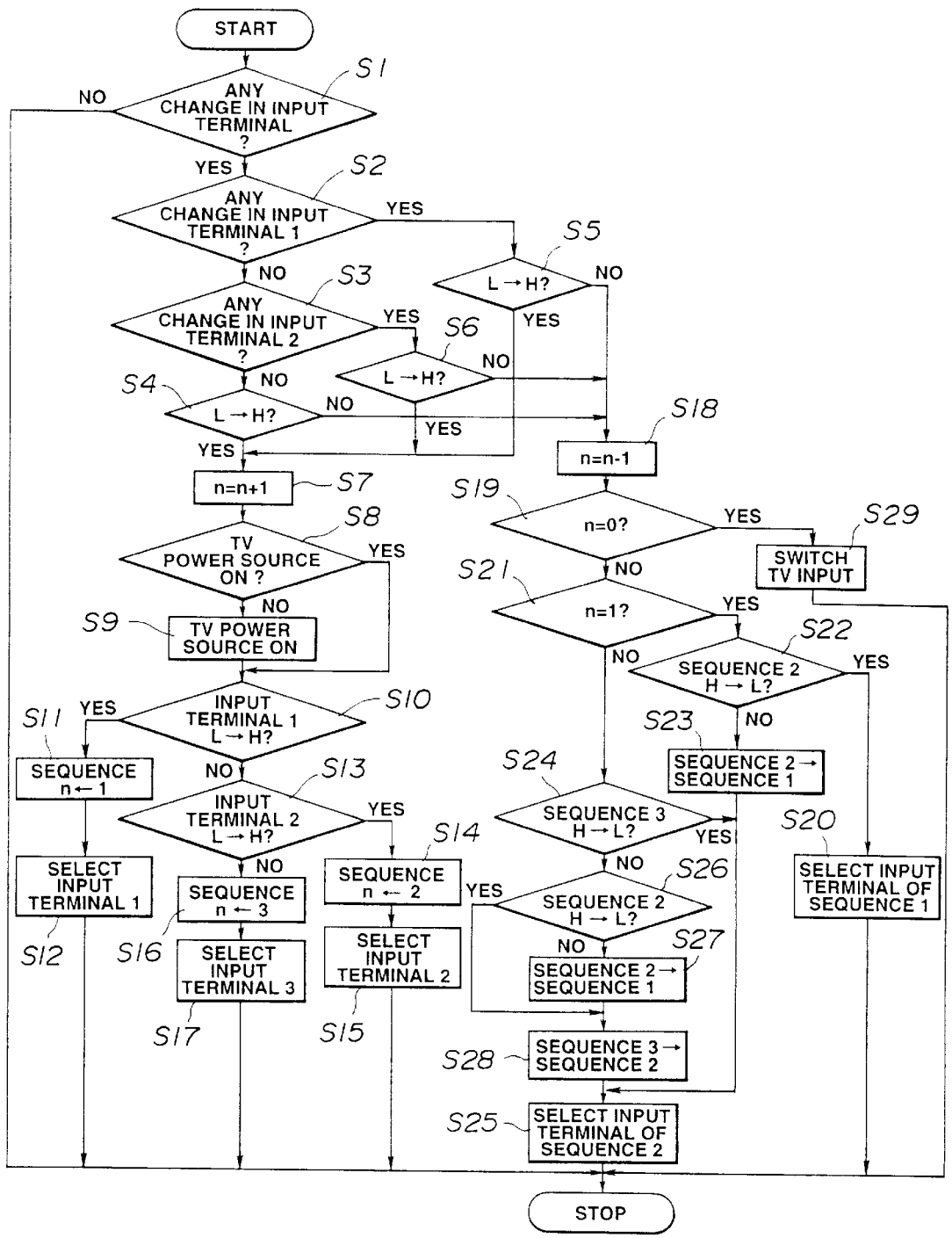
FIG. 8 is a flow chart for illustrating input switching operation for a micro-computer of the TV receiver.

The above-described input switching control is explained using a flow chart shown in FIG. 8.

It is first checked at step S1 whether or not the signal supplied to the control input/output terminals 8a, 8b and 8c has been changed from the H level to the L level or vice versa.

If no change has been caused in the level of the signal supplied to the control input/output terminals 8a to 8b, the input switching control operation in the present flow chart is terminated.

If there has been any change in the level of the signal supplied to the control input/output terminals 8a to 8c, it is judged at step S2 whether or not the level of the signal supplied to the control input/output terminal 8a has been changed.

If there has been no change in the level of the signal supplied to the control input/output terminals 8a, it is judged at step S3 whether or not the level of the signal supplied to the control input/output terminal 8b has been changed.

If there has been any change in the level of the signal supplied to the control input/output terminal 8b, it is judged at step S4 whether or not the level of the signal supplied to the control input/output terminal 8c has been changed from the L level to the H level.

If there has been any change in the level of the signal supplied to the control input/output terminal 8a at step S2 or in the level of the signal supplied to the control input/output terminal 8b at step S3, it is judged at steps S5 and S6 whether or not the level of the signal supplied to the control input/output terminal 8a or to the control input/output terminal 8b has been changed from the L level to the H level, respectively.

If it is found at steps S2, S3 that the level of the signal supplied to the control input/output terminal 8a, control input/output terminal 8b or to the control input/output terminal 8c has been changed form the L level to the H level, the microcomputer 6 counts up at step S7 the index $\underline{n}$ of the sequence information memory by 1($n=n+1$).

The sequence information memory means a storage area for storing the terminal numbers, as the information on the control input/output terminal, to which the input has been switched, in the sequence in which switching has been made. The control input/output terminal, stored in the n'th area of the sequence information memory, referred to herein as a sequence information memory [n], specifies that the input has been switched for the n'th time.

It is then judged at step S8 whether or not the power source of the TV receiver 1 has been turned on.

The micro-computer 6 manages control at step S9 for turning on the power source of the TV receiver 1 only when the power source of the TV receiver TV1 has not been turned on.

It is then judged at step S10 whether or not the level of the signal supplied to the control output terminal 8a has been changed from the L,level to the H level.

If the level of the signal supplied to the control input/output terminal 8a has been changed from the L level to the H level, the terminal number "1" of the control input/output terminal 8a is stored at step S11 in the sequence information memory [n].

The micro-computer 6 then switches at step S12 the input so that the input to the TV receiver TV1 will be an input at the control input/output terminal 8a, and terminates the input switching in the present flow chart.

If the level of the signal supplied to the input/output terminal 8b has not been changed from the L level to the H level, the micro-computer 6 judges at step S13 whether or not the level of the signal supplied to the control input/output terminal 8b has been changed from the L level to the H level.

If the level of the signal supplied to the input/output terminal 8b has changed from the L level to the H level, the micro-computer 6 causes the terminal number "2" of the control input/output number 8b to be stored at step S14 in the sequence information memory [n].

The micro-computer 6 switches the input at step S15 so that the input to the TV receiver TV1 will be an input at the control input/output terminal 8b, and terminates the input switching in the present flow chart.

If the level of the signal supplied to the input/output terminal 8b has not changed from the L level to the H level, the micro-computer 6 causes the terminal number "3" of the control input/output number 8b to be stored at step S16 in the sequence information memory [n].

The micro-computer 6 switches at the input at step S17 so that the input to the TV receiver TV1 will be an input at the control input/output terminal 8c, and terminates the input switching in the present flow chart.

On the other hand, if the level of the signal supplied to the control input/output terminal 8a, control input/output terminal 8b or to the control input/output terminal 8c has not been changed at steps S5, S6 nor at step S7 from the L level to the H level, that is if the level of the signal supplied to the control input/output terminal 8a, control input/output terminal 8b or to the control input/output terminal 8c has been changed from the H level to the L level, the index n of the sequence information memory, having stored therein the terminal number of the control input/output terminal to which the input was switched temporally before the control input/output terminal to which the input is currently switched, is found at step S18 ($n=n-1$).

It is then step S18 whether or not the index of the sequence information memory is "0".

If the index n of the sequence information memory is "0", the input to the TV receiver TV1 is switched at step S29 to the Internal TV signals to terminate the input switching control in the present flow chart.

If the index n of the sequence information is not "0", it is checked at step S21 whether or not the index n of the sequence information memory is "1".

If the index n of the sequence information memory is "1", it is checked at step S22 whether or not the level of the signal supplied to the control input/output terminal of the terminal number stored in the sequence information memory [n=2] has been changed from the H level to the L level.

If the level of the signal supplied to the control input/output terminal of the terminal number stored in the sequence information memory [n=2] has been changed from the H level to the L level, the micro-computer switches the input at step S20 so that the input to TV1 is the input from the control input/output terminal of the terminal number stored in the sequence information memory [n=1] before terminating the input switching in the present flow chart.

If the level of the signal supplied to the control input/output terminal of the terminal number stored in the sequence information memory [n=2] has not been changed from the H level to the L level, that is if the signal level has been changed from the L level to the H level, the micro-computer 6 causes the terminal number stored in the sequence information memory [n=2] to be stored at step S23 in the directly previous sequence information memory [n=1].

The micro-computer switches the input at step S25 so that the input to TV1 is the input from the control input/output terminal of the terminal number stored in the sequence information memory [n=2] before terminating the input switching in the present flow chart.

The micro-computer switches the input at step S20 so that the input to TV1 is the input from the control input/output terminal of the terminal number stored in the sequence information memory [n=1], in a manner not shown, before terminating the input switching in the present flow chart.

If at step S21 the index n of the sequence information memory is not "1", it is checked at step S24 whether or not the level of the signal supplied to the control input/output terminal of the terminal number stored in the sequence information memory [n=3] has been changed from the H level to the L level.

If the level of the signal supplied to the control input/output terminal of the terminal number stored in the sequence information memory [n=3] has been changed from the H level to the L level, the micro-computer switches the input at step S25 so that the input to TV1 is the input from the control input/output terminal of the terminal number stored in the directly previous sequence information memory [n=2] before terminating the input switching in the present flow chart.

If the level of the signal supplied to the control input/output terminal of the terminal number stored in the sequence information memory [n=3] has not been changed from the H level to the L level, the micro-computer judges at step S26 whether or not the level of the signal supplied to the control input/output terminal of the terminal number stored in the directly previous sequence information memory [n=2] has been changed from the H level to the L level.

Only if the level of the signal supplied to the control input/output terminal of the terminal number stored in the sequence information memory [n=2] has not been changed from the H level to the L level, that is only if the signal level has been changed form the L level to the H level, the micro-computer 6 causes the terminal number stored in the sequence information memory [n=2] to be stored at step S27 in the directly previous sequence information memory [n=1].

The terminal number stored in the sequence information memory [n=3] is then stored at step S28 in the directly previous sequence information memory [n=2].

The micro-computer switches the input at step S25 so that the input to TV1 is the input from the control input/output terminal of the terminal number stored in the sequence information memory [n=2], before terminating the input switching in the present flow chart.

An input switching control device according to a second embodiment of the present invention will be hereinafter explained.

There are occasions wherein, for viewing a picture taken by a camera or hearing playback speech on a Tv receiver, a camera is connected to external input terminals of a TV receiver or a VTR.

Figure 9:
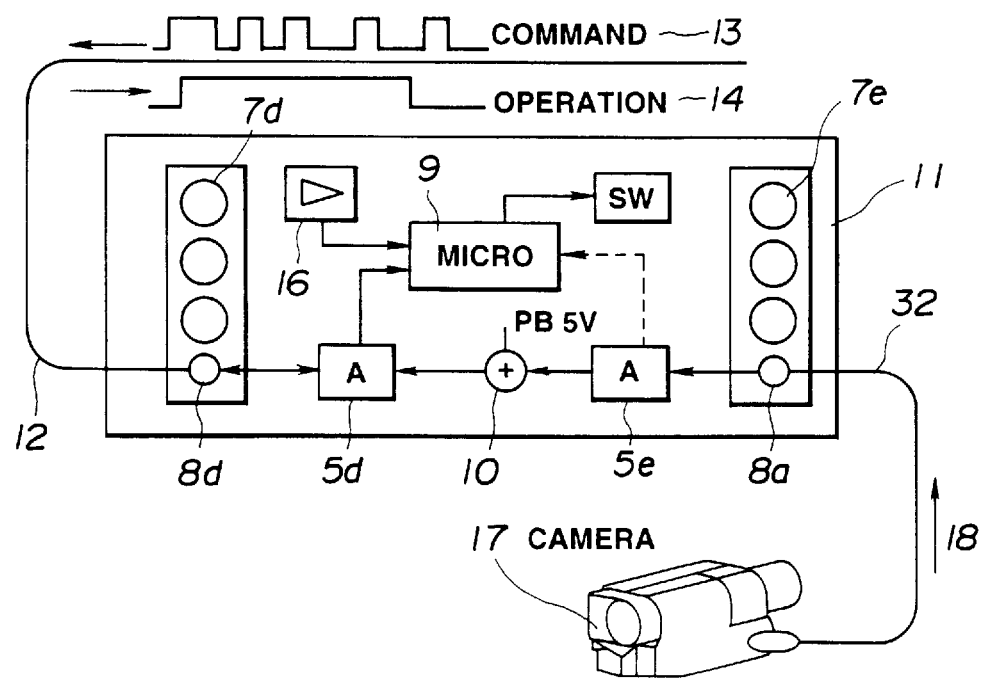
FIG. 9 illustrates the state of connection between a TV receiver and a camera under application of an input switching device according to the present invention.

Thus, in the present second embodiment, the above-described input switching control device is employed, and input switching is done in s controlled manner between a VTR 11 and a camera 17, as shown in FIG. 9.

The parts or components having the same operation as that of the VTR 11 shown in FIG. 6 are depicted by the same numerals and detailed description s omitted for clarity.

The VTR 11 has an external input terminal 7e, a control input/output terminal 8e for coping with an input at the external input terminal 7e, and communication circuits 5d and 5e, as shown in FIG. 9. The VTR 11 and the camera 17 are interconnected by a control line 32. In addition, the VTR 11 is connected to TV 1 over a control line 12 as shown in FIG. 3.

The playback DC voltage is entered at the control input/output terminal 8e from the camera 17 over a control line 18 as in the case of interconnecting the TV and the VTR as described previously. The playback DC voltage is supplied to the communication circuit 5e. The communication circuit 5e detects the playback DC voltage transmitted from the communication circuit 5e and transmits the detected playback DC voltage to a micro-computer 9. The micro-computer 9 detects the rise of the playback DC voltage from the communication circuit 5e and switches the input to the VTR 11 to the input from the external input terminal 7e.

Simultaneously, the communication circuit 5e sends the detected playback DC voltage via the additive unit 10 to the communication circuit 5d, which then transmits the playback DC voltage from the communication circuit 5f via the control input terminal 8d and the control line 12 to TV1 shown in FIG. 6.

Consequently, when the camera 17 is in the playback state, as in the case of the interconnected TV receiver and VTR, as described previously, the TV has its input automatically switched to the playback picture signals from the camera 17 and the playback speech signals. Thus the TV receiver can be connected to existing equipments, as in the case of the above-described first embodiment, while the interconnection between existing equipments may be achieved easily.

It is also possible for the micro-computer 9 to detect hitherto employed communication signals specifying the playback state in place of the playback DC voltage transmitted from the camera 17. In such case, a signal corresponding to the playback DC voltage may be supplied by the micro-computer 9 to the additive unit 10.

Although the communication circuits 5d, 5e are configured for unidirectional communication, they may also be configured for full duplex bi-directional communication.

An input switching control device according to a third embodiment of the present invention will be hereinafter explained.

For hearing the speech of a channel input-selected by the TV receiver, or the speech reproduced by a VTR, an audio amplifier is connected in many cases to external output terminals of a TV receiver.

Figure 10:
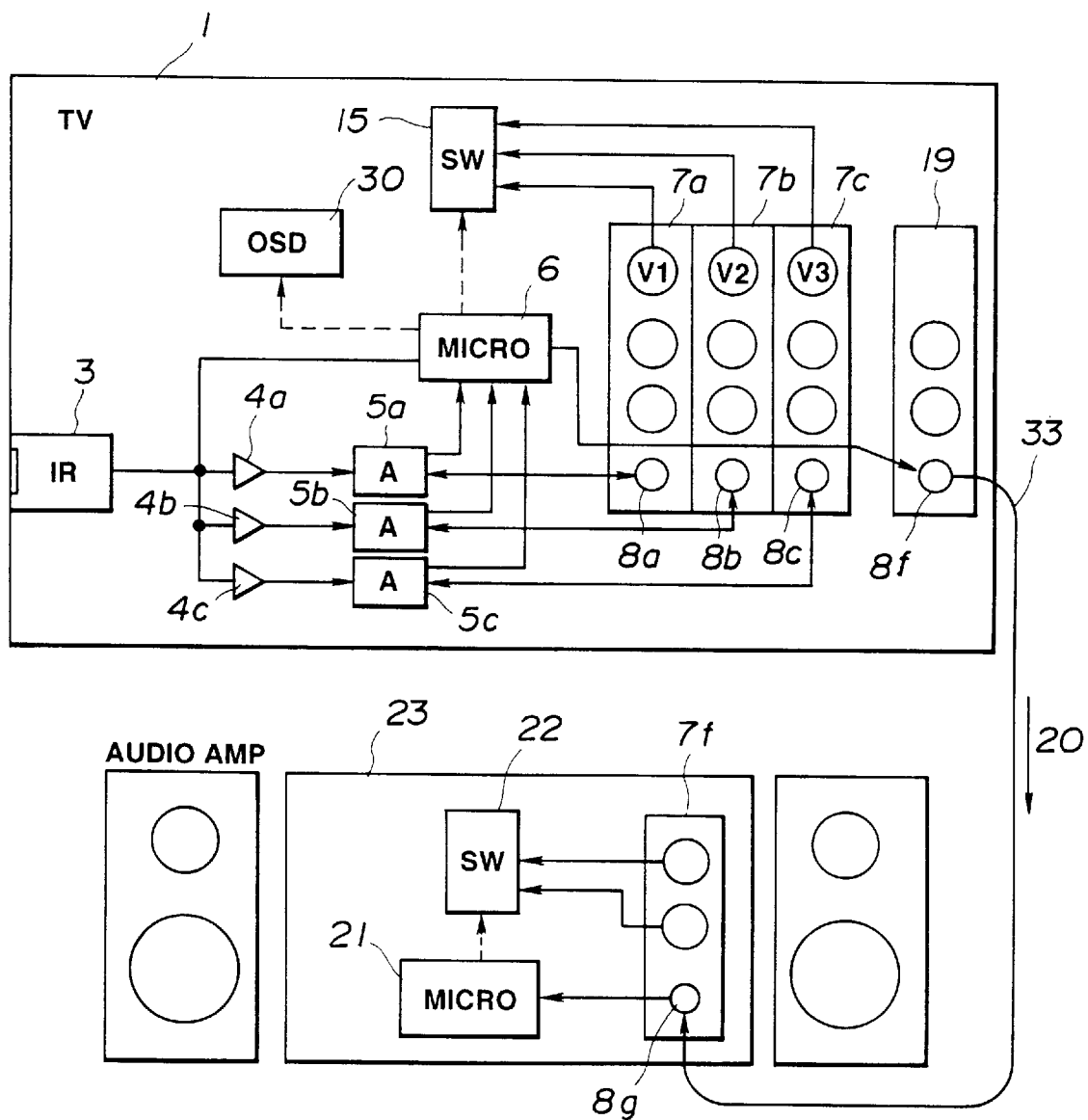
FIG. 10 illustrates the state of connection between a TV receiver and an audio amplifier under application of an input switching device according to the present invention.

In the present third embodiment, input switching between a TV receiver TV1 and an audio amplifier 23 is done by application of the input switching control device, as shown in FIG. 10.

The parts or components having the same operation as that of the TV1 shown in FIG. 6 are depicted by the same numerals and detailed description s omitted for clarity.

The TV receiver TV1 includes an external output terminal 19 and a control input/output terminal 8f for coping with an output of the external output terminal 19, as shown in FIG. 10. The TV receiver TV1 also includes communication circuits 5a, 5b and 5c for executing e.g., unidirectional communication.

In addition, the TV receiver TV1 and the audio amplifier 23 are interconnected over a control line 33. To the control input/output terminals 8a, 8b and 8c of the TV receiver TV1 are connected VTR11, VTR12 and VTR13, as shown in FIG. 6, although the connecting state is not shown in FIG. 10.

The audio amplifier 23 includes an external input terminal 7f, a control input/output terminal 8g for coping with input of the external input terminal 7f, an input changeover switch 22 for switching to an input from the external input terminal 7f, and a micro-computer 21 for detecting the operating information entering the control input/output terminal 8g for controlling the input switching in the input changeover switch 22.

The speech signals of the channel input-selected by the TV receiver TV1 are supplied to the external output terminal 19. When outputting the speech signals from the TV1 or one of VTR11, VTR 12 and VTR13, the micro-computer 6 selects the speech to be outputted to the audio amplifier 23 under optionally set conditions, and transmits the speech DC voltage corresponding to the determined output speech to the control input/output terminal 8f. The speech DC voltage is transmitted over the control line 33 to the audio amplifier 23.

The speech DC voltage transmitted from TV1 to the audio amplifier 23 is fed via control input/output terminal 8g of the audio amplifier 23 to the micro-computer 23. The micro-computer 21 detects the rise of the playback DC voltage supplied via the control input/output terminal 8g and switches the input to the input changeover switch 22 for switching the speech input to the external input terminal 7f. In addition, the micro-computer 21 detects the decay of the playback DC voltage supplied via the control input/output terminal 8g and switches the input to the input changeover switch 22 so that the speech input will be a previous input.

Thus, if the VTR1 is in the playback state, the input of the audio amplifier 23 connected to the speech output of TV1 is also switched to the speech from VTR11.

Thus, with the present third embodiment, as with the first and second embodiments, the TV receiver can be connected to existing equipments, while interconnection among the different equipments may also be facilitated.

In the above-described third embodiment, the speech DC voltage supplied from the micro-computer 6 to the control input/output terminal 8f in case of outputting the speech signal from TV1 or one of VTR11, VTR12 and VTR13 corresponds to the output speech selected by the micro-computer 6 under optionally set conditions. Alternatively, the playback DC voltage detected by the communication circuits 5a to 5c of the TV receiver TV1 may be simply summed to the DC voltage at the time of speech selection by the TV receiver TV1.

Although the communication circuits 5a, 5b and 5c effectuate unidirectional communication, these may also be configured for full duplex bi-directional communication.

The OFF information of a speaker enclosed within TV1 may also be summed to the speech DC voltage supplied from the micro-computer 6 to the control input/output terminal 8f. In this case, the speaker enclosed in the TV receiver TV1 is in the ON state. When the input to the TV receiver TV1 is switched to the internal input, the speech DC voltage level is at the H level. Thus, if the speaker enclosed in the TV receiver TV1 is ON, the speech is automatically outputted from the enclosed speaker, whereas, if the speaker enclosed in the TV receiver TV1 is OFF, the speech is automatically outputted from the audio amplifier 23.

In the TV receiver TV1, a communication circuit similar to the communication circuits 5a, 5b and 5c may be provided between the micro-computer 6 and the control input/output terminal 8f. Similarly, in the audio amplifier 23, a communication circuit similar to the communication circuits 5a, 5b and 5c may be provided between the micro-computer 21 and the control input/output terminal 8g.

What is claimed is:

1. A communication apparatus which establishes either bi-directional or uni-directional full duplex communications between transmitting side equipment and receiving side equipment for detecting a transmitting side signal V2 transmitted from said transmission side equipment via said full duplex communication to said receiving side equipment, said transmitting side signal transmitted across a transmitting side impedance R2 of said transmitting side equipment resulting in a signal V3 transmitted to said receiving side equipment and across a receiving side impedance R1 of said receiving side equipment resulting in a receiving side signal V1, said apparatus comprising:

arithmetic means for calculating said transmitting side signal V2 on the basis of said signal V3 transmitted to said receiving side equipment, said receiving side signal V1 and an impedance ratio between said transmitting side impedance R2 and said receiving side impedance R1; and comparator means for comparing said signal V3 transmitted to said receiving side equipment to a high reference voltage V5 and a low reference voltage V6 and controlling a value of said receiving side impedance R1 such that said signal V3 transmitted to said receiving side equipment is within the range of said high reference voltage V5 and said low reference voltage V6.

2. The apparatus of claim 1, wherein said comparator means compares said signal V3 transmitted to said receiving side equipment to said high reference voltage V5 and said low reference voltage V6 upon determining that said receiving side signal V1 is at a different logical level than said transmitting side signal V2 calculated by said arithmetic means.

3. The apparatus of claim 1, wherein said comparator means increases said value of said receiving side impedance R1 when said comparator means determines that said signal V3 transmitted to said receiving side equipment is greater than said high reference voltage V5.

4. The apparatus of claim 1, wherein said comparator means decreases said value of said receiving side impedance R1 when said comparator means determines that said signal V3 transmitted to said receiving side equipment is less than said low reference voltage V6.

5. The apparatus of claim 4, wherein said arithmetic means comprise first arithmetic means for multiplying said receiving side signal V1 by the ratio R1(R1+R2) and subtracting the result from said signal V3 transmitted to said receiving side equipment thereby yielding signal V4.

6. The apparatus of claim 5, wherein said receiving side impedance R1 is assumed to equal said transmitting side impedance R2 such that R1=R2, said arithmetic means further comprise second arithmetic means for multiplying signal V4 calculated by said first arithmetic means by 2, thereby yielding said transmitting side signal V2 calculated by said arithmetic means.

7. An input switching control apparatus which establishes either bi-directional or uni-directional full duplex communications between receiving side equipment and a plurality of transmitting side equipments for automatically switching said receiving side equipment to said plurality of transmitting side equipments, said apparatus comprising:

a plurality of input terminals for inputting signals received from said transmitting side equipments via said full duplex communication, each input terminal having an associated control input/output terminal for inputting/outputting control signals to and from respective transmitting side equipment;

switching means for switching said receiving side equipment to a respective input terminal connected to said respective transmitting side equipment, thereby establishing full duplex communication between said receiving side equipment and said respective transmitting side equipment;

detecting means for detecting when said control signals are received by said control input/output terminals; and controlling means for controlling said switching means to switch automatically said receiving side equipment to said respective input terminal when said detecting means detects said control signals are received by a respective control input/output terminal associated with said respective input terminal.

8. The apparatus of claim 7, wherein said receiving side equipment is a television and said plurality of transmitting side equipment includes at least a VCR.

9. The apparatus of claim 8, wherein said plurality of transmitting side equipment includes a plurality of VCRs.

10. The apparatus of claim 8, wherein said plurality of transmitting side equipment includes an on-screen display.

11. The apparatus of claim 8, wherein said plurality of transmitting side equipment includes a video camera coupled to said VCR, providing said television with video/audio signals via said VCR.

12. The apparatus of claim 8, wherein said plurality of transmitting side equipment includes an audio amplifier.

13. A communication apparatus which establishes either bi-directional or uni-directional full duplex communications between transmitting side equipment and receiving side equipment for detecting a transmitting side signal V2 transmitted from said transmission side equipment via said full duplex communication to said receiving side equipment, said transmitting side signal transmitted across a transmitting side impedance R2 of said transmitting side equipment resulting in a signal V3 transmitted to said receiving side equipment and across a receiving side impedance R1 of said receiving side equipment resulting in a receiving side signal V1, said apparatus comprising:

an arithmetic logic unit coupled to said receiving side equipment which calculates said transmitting side signal V2 on the basis of said signal V3 transmitted to said receiving side equipment, said receiving side signal V1 and an impedance ratio between said transmitting side impedance R2 and said receiving side impedance R1; and a comparator coupled to said receiving side equipment and said arithmetic logic unit which compares said signal V3 transmitted to said receiving side equipment to a high reference voltage VS and a low reference voltage V6 and controlling a value of said receiving side impedance R1 such that said signal V3 transmitted to said receiving side equipment is within the range of said high reference voltage VS and said low reference voltage V6.

14. The apparatus of claim 13, wherein said comparator compares said signal V3 transmitted to said receiving side equipment to said high reference voltage V5 and said low reference voltage V6 upon determining that said receiving side signal V1 is at a different logical level than said transmitting side signal V2 calculated by said arithmetic logic unit.

15. The apparatus of claim 13, wherein said comparator increases said value of said receiving side impedance R1 when said comparator determines that said signal V3 transmitted to said receiving side equipment is greater than said high reference voltage V5.

16. The apparatus of claim 13, wherein said comparator decreases said value of said receiving side impedance R1 when said comparator determines that said signal V3 transmitted to said receiving side equipment is less than said low reference voltage V6.

17. The apparatus of claim 13, wherein said arithmetic logic unit comprises a first arithmetic logic unit which multiplies said receiving side signal V1 by the ratio R1/(R1+R2) and subtracts the result from said signal V3 transmitted to said receiving side equipment thereby yielding signal V4.

18. The apparatus of claim 17, wherein said receiving side impedance R1 is assumed to equal said transmitting side impedance R2 such that R1=R2, said arithmetic logic unit comprises second arithmetic logic unit for multiplying signal V4 calculated by said first arithmetic logic unit by 2, thereby yielding said transmitting side signal V2 calculated by said arithmetic logic unit.

19. An input switching control apparatus which establishes either bi-directional or uni-directional full duplex communications between receiving side equipment and a plurality of transmitting side equipments for automatically switching said receiving side equipment to said plurality of transmitting side equipments, said apparatus comprising:

a plurality of input terminals for inputting signals received from said transmitting side equipments via said full duplex communication, each input terminal having an associated control input/output terminal for inputting/outputting control signals to and from respective transmitting side equipment;

a switch coupled to said plurality of input terminals for switching said receiving side equipment to a respective input terminal connected to said respective transmitting side equipment, to thereby establish full duplex communication between said receiving side equipment and said respective transmitting side equipment;

a detecting circuit coupled to said plurality of input terminals which detects when said control signals are received by said control input/output terminals; and a processor coupled to said detecting circuit and said switch which controls said switch to switch automatically said receiving side equipment to said respective input terminal when said detecting circuit detects said control signals are received by a respective control input/output terminal associated with said respective input terminal.

20. The apparatus of claim 19, wherein said receiving side equipment is a television and said plurality of transmitting side equipment includes at least a VCR.

21. The apparatus of claim 20, wherein said plurality of transmitting side equipment includes a plurality of VCRs.

22. The apparatus of claim 20, wherein said plurality of transmitting side equipment includes an on-screen display.

23. The apparatus of claim 20, wherein said plurality of transmitting side equipment includes a video camera coupled to said VCR, providing said television with video/audio signals via said VCR.

24. The apparatus of claim 20, wherein said plurality of transmitting side equipment includes an audio amplifier.

25. A communication method which establishes either bi-directional or uni-directional full duplex communications between transmitting side equipment and receiving side equipment for detecting a transmitting side signal V2 transmitted from said transmission side equipment via said full duplex communication to said receiving side equipment, said transmitting side signal transmitted across a transmitting side impedance R2 of said transmitting side equipment resulting in a signal V3 transmitted to said receiving side equipment and across receiving side impedance R1 of said receiving side equipment resulting in a receiving side signal V1, said method comprising the steps of:

calculating said transmitting side signal V2 on the basis of said signal V3 transmitted to said receiving side equipment, said receiving side signal V1 and an impedance ratio between said transmitting side impedance R2 and said receiving side impedance R1; and comparing said signal V3 transmitted to said receiving side equipment to a high reference voltage V5 and a low reference voltage V6 and controlling a value of said receiving side impedance R1 such that said signal V3 transmitted to said receiving side equipment is within the range of said high reference voltage V5 and said low reference voltage V6.

26. The method of claim 25, wherein said step of comparing compares said signal V3 transmitted to said receiving side equipment to said high reference voltage V5 and said low reference voltage V6 upon determining that said receiving side signal V1 is at a different logical level than said transmitting side signal V2 calculated by said step of calculating.

27. The method of claim 25, wherein said step of comparing increases said value of said receiving side impedance R1 when said signal V3 transmitted to said receiving side equipment is greater than said high reference voltage V5.

28. The method of claim 25, wherein said step of comparing decreases said value of said receiving side impedance R1 when said signal V3 transmitted to said receiving side equipment is less than said low reference voltage V6.

29. The method of claim 28, wherein said step of calculating comprises the steps of:

multiplying said receiving side signal V1 by the ratio R1/(R1+R2); and subtracting the result from said signal V3 transmitted to said receiving side equipment thereby yielding signal V4.

30. The method of claim 29, wherein said receiving side impedance R1 is assumed to equal said transmitting side impedance R2 such that R1=R2, said method further comprising the step of multiplying by 2 said signal V4 calculated by said step of subtracting, thereby yielding said transmitting side signal V2 calculated by said calculating step.

31. An input switching control method which establishes either bi-directional or uni-directional full duplex communications between receiving side equipment and a plurality of transmitting side equipments for automatically switching said receiving side equipment to said plurality of transmitting side equipments, said method comprising the steps of:

inputting signals at a plurality of input terminals received from said transmitting side equipments via said full duplex communication, and inputting/outputting control signals through associated control input/output terminals to and from respective transmitting side equipments; switching said receiving side equipment to a respective input terminal connected to a respective transmitting side equipment, thereby establishing full duplex communication between said receiving side equipment and said respective transmitting side equipment;

detecting when said control signals are received by said control input/output terminals; and controlling said step of switching to switch automatically said receiving side equipment to said respective input terminal when said step of detecting detects said control signals are received by a respective control input/output terminal associated with said respective input terminal.

32. The method of claim 31, wherein said step of switching couples a television to at least a VCR.

33. The method of claim 32, wherein said step of switching couples said television among a plurality of VCRs.

34. The method of claim 32, wherein said step of switching couples said television to an on-screen display.

35. The method of claim 32, wherein said step of switching couples said television to a video camera coupled to said VCR, which provides said television with video/audio signals via said VCR.

36. The method of claim 32, wherein said step of switching couples said television to an audio amplifier.

* * * * *